June 27, 1939.   F. OFFERMANNS   2,164,040
METHOD FOR THE DECOMPOSITION OF RAW CELLULOSE
Filed July 21, 1936
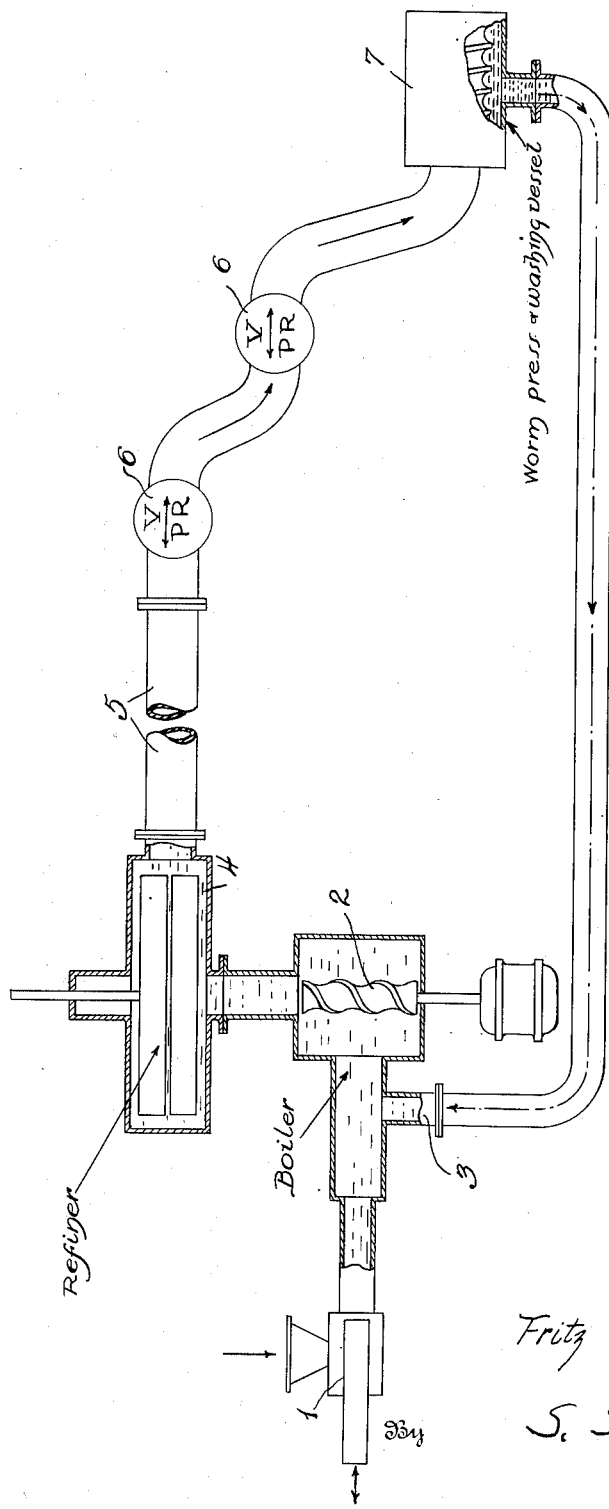
Inventor
Fritz Offermanns
S. Sokal
By
Attorney Patented June 27, 1939

2,164,040

UNITED STATES PATENT OFFICE 2,164,040

METHOD FOR THE DECOMPOSITION OF RAW CELLULOSE

Fritz Offermanns, Muskau, Oberlausitz, Germany

Application July 21, 1936, Serial No. 91,699
In Germany April 18, 1936

1 Claim. (Cl. 92—6)

It has become known to treat raw cellulose, for instance woods, according to alkaline or acid methods under pressure, with hot boiling liquids, to then reduce to fibres the boiled material and to wash it out. The known methods for the decomposition of raw cellulose are batch methods. As according to these methods large quantities of raw substance have to be worked in one operation, many difficulties occur, such as irregular soaking with boiling liquid, irregular heat distribution in the boiling vessel, continually changing degree of decomposition, varying output.

These inconveniences can be avoided if, instead of the batch treating of large quantities of raw cellulose a continuous treatment of accordingly measured quantities is selected.

According to the invention the cellulose containing initial material is disintegrated, compressed in a press, soaked at 6–12 atmospheres with lye, acid or salt solution of 150–220° C., then reduced to fibres and continually forced with a pressure of 6–12 atmospheres through a pressure pipe into worm presses or washing vessels. The soaking with hot lye, acid or salt solution under pressure can be effected prior to or after the reducing to fibres. The decomposed materials obtained in the worm presses may be returned completely or partly into the continuous process.

A plant for carrying through the method is illustrated by way of example in the only figure of the accompanying drawing in which 1 is the press, 2 the conveying worm, 3 the feed pipe for decomposing liquids, 4 the refiner or reducer to fibres, 5 the pressure pipe, 6 the pressure lock and 7 the worm press.

In the press 1 the disintegrated initial material is compressed by a reciprocating piston and soaked in an other vessel with decomposing agent, for instance soda lye of 150 to 220° C. at 6–12 atmospheres. The material which has thus been preliminarily treated is then fed by a conveying worm 2 to the reducer to fibres 4. This reducer consists of two discs or cylinders or similarly acting devices. The material standing under 6 to 12 atmospheres flows from the reducer into a pressure pipe 5 equipped with pressure locks and is then continually pressed into a worm press 7.

Cellulose containing materials are for instance: pine, spruce, beech, grasses, straw, cotton wastes.

The method above described permits of working up for the paper-cardboard-cellulose industry, besides first quality materials also inferior waste substances. The continuous working method enables to influence the agents decisive for the decomposition. The decomposition degree can be adapted to the actual initial material by accordingly selecting the length of the pressure pipe 5. The fact that the procedure ensures of a rapid and cheap decomposing and of a high quality end product as an accelerated dissolution of the incrustation takes place and at the same time a careful treatment of the soluble cellulose substances is ensured owing to the comparatively short duration of the action of the chemical decomposing substances.

What I do claim as my invention and desire to secure by Letters Patent is:

A continuous process for decomposing woody material and recovering cellulose, which comprises the steps of predisintegrating the raw material, working up the predisintegrated material into a press cake, introducing the press cake into a pre-treating boiler and treating therein with soda lye liquor at 150° to 220° C. and under a pressure of 6 to 12 atmospheres, passing the treated material to a refiner to reduce the same to a fibrous condition at the same temperature and pressure, then passing the reduced fibrous material to a decomposition pressure pipe of relatively long length and small diameter and accelerating dissolution of the natural incrustation material therein by subjecting the same to said soda lye at a temperature between 150° to 220° C. and under a pressure of 6 to 12 atmospheres, the time period of decomposition in said pipe being predetermined according to the material being treated and the degree of decomposition desired, and then passing the decomposed fibrous material through a worm press and washing vessel to separate the liquor from the cellulose-containing material, and then recycling at least part of the liquor to the pre-treating boiler for reuse.

FRITZ OFFERMANNS.